(12) United States Patent
Lee et al.

(10) Patent No.: US 11,142,838 B2
(45) Date of Patent: *Oct. 12, 2021

(54) ELECTROLYTIC COPPER FOIL FOR SECONDARY BATTERY, HAVING ENHANCED FLEXURAL RESISTANCE, AND METHOD FOR PRODUCING THE SAME

(71) Applicant: ILJIN MATERIALS CO., LTD., Iksan (KR)

(72) Inventors: Sun Hyoung Lee, Iksan (KR); Tae Jin Jo, Iksan (KR); Seul-Ki Park, Iksan (KR); Ki Deok Song, Iksan (KR)

(73) Assignee: ILJIN MATERIALS CO., LTD., Iksan-si (KR)

( * ) Notice: Subject to any disclaimer, the term of this patent is extended or adjusted under 35 U.S.C. 154(b) by 173 days.

This patent is subject to a terminal disclaimer.

(21) Appl. No.: 16/343,553

(22) PCT Filed: Mar. 28, 2017

(86) PCT No.: PCT/KR2017/003374
§ 371 (c)(1),
(2) Date: Apr. 19, 2019

(87) PCT Pub. No.: WO2018/088645
PCT Pub. Date: May 17, 2018

(65) Prior Publication Data
US 2019/0316266 A1 Oct. 17, 2019

(30) Foreign Application Priority Data

Nov. 11, 2016 (KR) .................. 10-2016-0150362

(51) Int. Cl.
*C22C 9/00* (2006.01)
*C25D 1/04* (2006.01)
(Continued)

(52) U.S. Cl.
CPC .............. *C25D 3/38* (2013.01); *C25D 1/04* (2013.01); *H01M 4/0452* (2013.01);
(Continued)

(58) Field of Classification Search
None
See application file for complete search history.

(56) References Cited

U.S. PATENT DOCUMENTS

| | | | |
|---|---|---|---|
| 5,958,209 A | 9/1999 | Sakai | |
| 2007/0287020 A1* | 12/2007 | Saito | ............. C25D 1/04 428/606 |
| 2016/0013493 A1 | 1/2016 | Shinozaki | |

FOREIGN PATENT DOCUMENTS

| | | |
|---|---|---|
| JP | 2004-263296 A | 9/2004 |
| JP | 10-2007-0117465 A | 12/2007 |

(Continued)

*Primary Examiner* — Yoshitoshi Takeuchi
(74) *Attorney, Agent, or Firm* — Patent Office of Dr. Chung Park

(57) ABSTRACT

The present invention relates to an electrolytic copper foil for a secondary battery, having excellent flexural resistance, and a method for producing the electrolytic copper foil. The electrolytic copper foil for a secondary battery has excellent flexural resistance even without the use of many additives in a copper electrolyte when producing a copper foil. The electrolytic copper foil for a secondary battery according to the present invention is an electrolytic copper foil for a secondary battery, which is produced from a plating solution, containing total organic carbon (TOC), cobalt and arsenic, by using a drum and is coated with a negative electrode active material, wherein the ratio between the TOC, cobalt and arsenic contained in the electrolytic copper foil follows the following formula 1:

TOC/(cobalt+arsenic)=1.30–1.55.    [Formula 1]

6 Claims, 1 Drawing Sheet

(51) Int. Cl.
- *C25D 3/38* (2006.01)
- *H01M 4/04* (2006.01)
- *H01M 4/1395* (2010.01)
- *H01M 4/139* (2010.01)
- *H01M 4/134* (2010.01)
- *H01M 4/38* (2006.01)

(52) U.S. Cl.
CPC ......... *H01M 4/134* (2013.01); *H01M 4/1395* (2013.01); *H01M 4/38* (2013.01)

(56) References Cited

FOREIGN PATENT DOCUMENTS

| | | |
|---|---|---|
| JP | WO2014/119583 A1 | 8/2014 |
| JP | 2016-125120 A | 7/2016 |
| KR | 10-2014-0041804 A | 4/2014 |
| KR | 10-1500545 B1 | 3/2015 |
| KR | 10-2016-0119269 A | 10/2016 |

* cited by examiner

[FIG. 1]
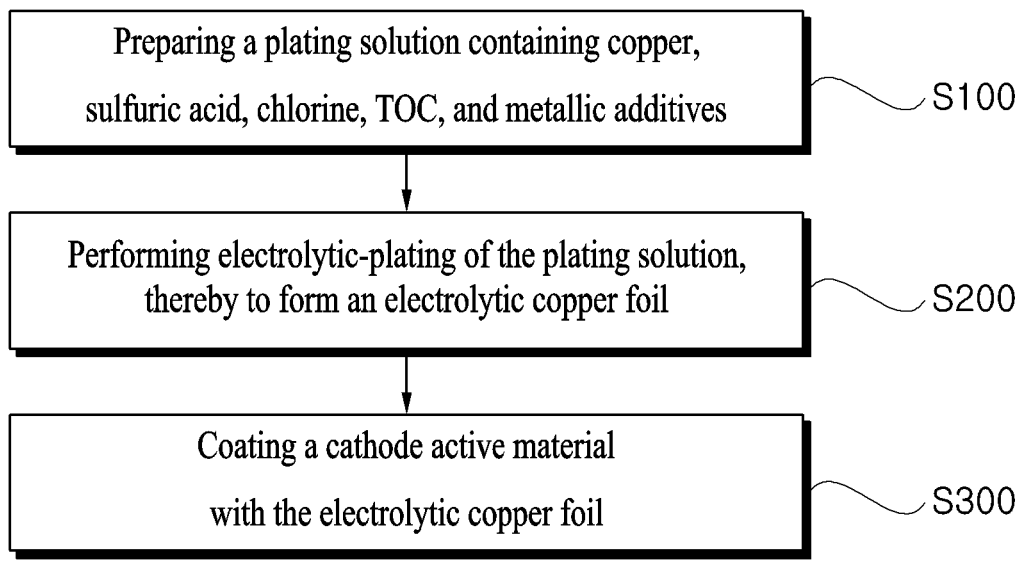
[FIG. 2]
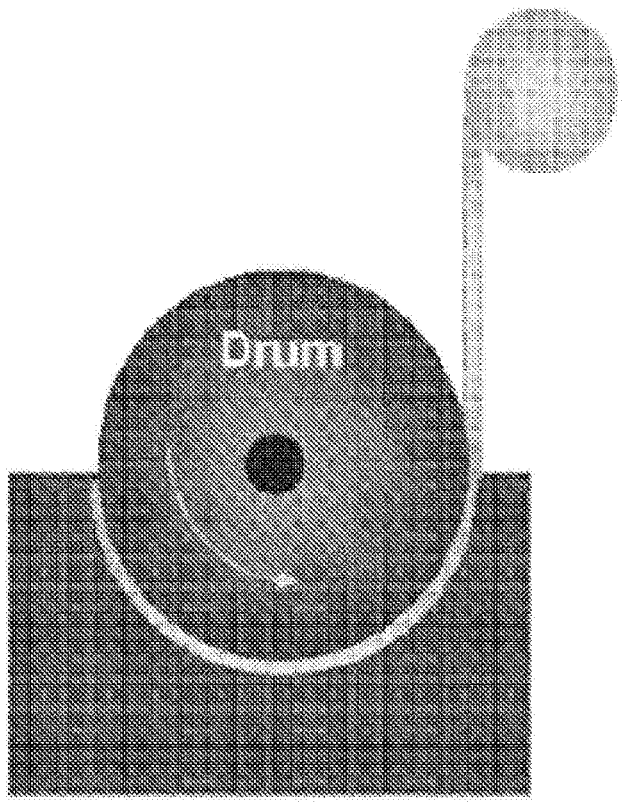

ELECTROLYTIC COPPER FOIL FOR SECONDARY BATTERY, HAVING ENHANCED FLEXURAL RESISTANCE, AND METHOD FOR PRODUCING THE SAME

CROSS-REFERENCE TO PRIOR APPLICATIONS

This application is a national Stage Patent Application of PCT International Patent Application No. PCT/KR2017/003374, filed on Mar. 28, 2017 under 35 U.S.C. § 371, which claims priority of Korean Patent Application No. 10-2016-0150362, filed on Nov. 11, 2016, which are all hereby incorporated by reference in their entirety.

TECHNICAL FIELD

The present disclosure relates to an electrolytic copper foil for a secondary battery having excellent flexural endurance and a method for producing the electrolytic copper foil. More specifically, the present disclosure relates to an electrolytic copper foil for a secondary battery having excellent flexural endurance and a method for producing the electrolytic copper foil in which, the copper foil has excellent flexural endurance though copper electrolytic solution does not contain many additives in the copper foil production.

BACKGROUND

In general, an electrolytic copper foil is widely used as a base material for a PCB (Printed Circuit Board) used in the electric/electronic industry. A demand to the electrolytic copper foil is rapidly increasing mainly in small-sized products such as a slim notebook computer, a personal digital assistant (PDA), an electronic book, an MP3 player, a next-generation mobile phone, and an ultra-thin flat panel display. Further, the properties of electrolytic copper foil are improved to be widely used as a negative electrode current collector for a secondary battery.

Generally, electrolytic copper foil is produced by an electrolysis method and is produced in an electrolytic bath composed of a cylindrical cathode (referred to a drum), an anode made of titanium and spaced at a constant spacing from the cathode and coated with a lead alloy or iridium oxide, an electrolytic solution and a power supply. The electrolytic solution is composed of sulfuric acid and/or copper sulfate. When a direct current flows between the cathode and the anode while rotating the cylindrical cathode, copper is electrodeposited on the cathode to enable continuous electrolytic copper foil production. The process of reducing copper ions into metal by the electrolysis method is referred to the foil manufacturing process.

The copper foil obtained from the foil manufacturing process is subjected to an additional post-treatment process, if necessary, such as, a roughness treatment (nodule treatment process) in order to improve the adhesion with the insulating substrate, a diffusion prevention treatment for preventing the diffusion of copper ions, a rust prevention treatment for preventing oxidation from the outside, and a chemical adhesion enhancement treatment to complement the adhesion to the insulation substrate. Such a post-treatment process, that is, surface treatment process may produce a low profile copper foil for a printed circuit. When only the rust-proof treatment is done in the surface treatment process, the resulting copper foil may be used for the secondary battery.

The electrodeposited copper foil, when used for printed circuit boards, is surface treated and supplied to a PCB manufacturer in a bonded form (laminate) to an insulating substrate. In contrast, when used for a secondary battery, the electrodeposited copper foil is subjected to only the rust-proofing process and then supplied to a secondary battery producing company.

The secondary battery has an anode and a cathode. A positive electrode active material is attached on a surface of a positive current collector. On a surface of a negative electrode current collector, a negative electrode active material is bonded. When the secondary battery is repeatedly charged and discharged, stress is applied between the current collector and the active material due to the expansion and contraction of the active material layer. Thus, there occurs a problem that the active material layer is peeled from the collector or the current collector is broken and thus the charging and discharging cycle characteristics are degraded.

Therefore, there is a need for an electrolytic copper foil for secondary batteries in which change of physical properties of the copper foil is small and the flexural endurance thereof is excellent such that the copper foil can withstand a stress due to the expansion and contraction of the active material layer when charging/discharging of the battery is repeated.

DISCLOSURE

Technical Purposes

One purpose of the present disclosure is to provide an electrolytic copper foil for a secondary battery having excellent flexural endurance and a method for producing the electrolytic copper foil, in which TOC and metallic additives, that is, cobalt, and arsenic are present in a certain amount in a copper electrolytic solution to maintain the physical properties of the copper foil to be uniform and thus to have a high flexural endurance.

Another purpose of the present disclosure is to provide an electrolytic copper foil for a secondary battery having excellent flexural endurance and a method for producing the electrolytic copper foil, in which a high flexural endurance of the copper foil results in excellent battery lifespan.

Technical Solutions

In a first aspect of the present disclosure, there is provided an electrolytic copper foil for a secondary battery, wherein the electrolytic copper foil is produced using a drum in a plating solution containing copper, total organic carbon (TOC), cobalt, and arsenic, wherein the electrolytic copper foil is coated with a negative eletrode active material, wherein a content of TOC and contents of cobalt, and arsenic contained in the electrolytic copper foil satisfy a following Equation 1:

$$\text{TOC content/(cobalt content+arsenic content)}=1.30 \text{ to } 1.55. \qquad \text{[Equation 1]}$$

In one implementation of the first aspect, the electrolytic copper foil has bending times greater than or equal to 110 in a MIT bending test.

In one implementation of the first aspect, a concentration of the TOC contained in the plating solution is 100 ppm or greater.

In one implementation of the first aspect, the electrolytic copper foil has one face in direct contact with the drum and the other face opposite to said one face, wherein a Rz roughness of each of said one and other faces is smaller than or equal to 2.0 μm.

In one implementation of the first aspect, a tensile strength of the electrolytic copper foil is in a range of 30 kgf/mm² to 51 kgf/mm².

In one implementation of the first aspect, an elongation of the electrolytic copper foil is in a range of 2% to 15%.

In one implementation of the first aspect, a thickness of the electrolytic copper foil is in a range of 4 μm to 10 μm.

In a second aspect of the present disclosure, there is provided a method for producing an electrolytic copper foil for a secondary battery, the method comprising: (1) preparing a plating solution containing copper, total organic carbon (TOC), cobalt, and arsenic; (2) performing electrolytic-plating of the plating solution using a drum at a temperature of 30° C. to 70° C. by applying a current at a current density 30 ASD to 150 ASD to the drum, thereby to form an electrolytic copper foil; and (3) coating negative electrode active material with the electrolytic copper foil, wherein a content of TOC and contents of cobalt, and arsenic contained in the electrolytic copper foil satisfy a following Equation 1:

TOC content/(cobalt content+arsenic content)=1.30 to 1.55. [Equation 1]

In one implementation of the second aspect, the electrolytic copper foil has bending times greater than or equal to 110 in a MIT bending test.

In one implementation of the second aspect, a concentration of the TOC contained in the plating solution is 100 ppm or greater.

In one implementation of the second aspect, the electrolytic copper foil formed by the electrolytic-plating in (2) has one face in direct contact with the drum and the other face opposite to said one face, wherein a Rz roughness of each of said one and other faces is smaller than or equal to 2.0 μm.

In one implementation of the second aspect, a tensile strength of the electrolytic copper foil is in a range of 30 kgf/mm² to 51 kgf/mm².

In one implementation of the second aspect, an elongation of the electrolytic copper foil is in a range of 2% to 15%.

In one implementation of the second aspect, a thickness of the electrolytic copper foil is in a range of 4 μm to 10 μm.

Technical Effects

In accordance with the present disclosure, TOC and metallic additives such as cobalt, and arsenic are present in a certain amount in a copper electrolytic solution to maintain the physical properties of the copper foil to be uniform and thus to have a high flexural endurance.

Further, in accordance with the present disclosure, an electrolytic copper foil for a secondary battery having excellent flexural endurance may be realized in which a high flexural endurance of the copper foil results in excellent battery lifespan.

BRIEF DESCRIPTION OF THE DRAWINGS

FIG. 1 is a flow chart showing a production method of an electrolytic copper foil for a secondary battery according to one embodiment of the present disclosure.

FIG. 2 shows a process of producing an electrolytic copper foil using a drum according to one embodiment of the present disclosure.

DETAILED DESCRIPTIONS

Details of embodiments are included in the detailed description and drawings.

The advantages and features of the present disclosure, and how to accomplish them, will be apparent with reference to the embodiments as described in detail below with reference to the accompanying drawings. However, the present disclosure is not limited to the embodiments disclosed below, but may be embodied in various other forms. In the following description, when a part is connected to another part, not only they are directly connected to each other, but also, they are indirectly connected with each other part via still another part therebetween. Further, parts of the drawing that are not related to the present disclosure are omitted for clarity of explanation of the present disclosure. Like parts are designated with like reference numerals throughout the specification.

Hereinafter, the present disclosure will be described with reference to the accompanying drawings.

The following describes in greater detail an electrolytic copper foil for a secondary battery with excellent flexural endurance according to one embodiment of the present disclosure.

An electrolytic copper foil for a secondary battery according to one embodiment of the present disclosure is produced using a drum. The electrolytic copper foil for the secondary battery may be coated with a negative electrode active material. The electrolytic copper foil includes a copper foil electrolytic for a secondary battery in which the electrolytic copper foil has bending times greater than or equal to 110 in a MIT bending test.

In the conventional electrolytic copper foil production technique, a method of increasing the strength of the copper foil and improving the flexural endurance by using a plurality of additives was used. However, when in the copper foil production, large number of additives are used, an elongation is reduced, and it is difficult to maintain the physical properties of the copper foil during the production of the copper foil, which is undesirable because the charge and discharge cycle characteristics of the secondary battery are lowered.

Thus, the present disclosure provides an electrolytic copper foil for a secondary battery having excellent flexural endurance and a method for producing the electrolytic copper foil in which, the copper foil has excellent flexural endurance though copper electrolytic solution does not contain many additives in the copper foil production.

In the electrolytic copper foil according to the present disclosure, the copper electrolytic solution used for copper plating has a predetermined content of TOC. Thus, the electrolytic copper foil for secondary batteries may be obtained to have improved flexural endurance while preventing physical properties of the copper foil from changing during production of the copper foil. In the electrolytic copper foil for the secondary battery in accordance with the present disclosure, the bending times thereof in the MIT bending test are 110 times or greater. The excellent flexing property of the copper foil may allow the foil to effectively absorb large stresses due to the large volume change of the active material during charging and discharging of the battery. This may prevent the degradation of the charging and discharging cycle characteristics or the destruction of the current collector.

According to the present disclosure, when the electrolytic copper foil production is carried out in a state in which the TOC of 100 ppm or more is contained in the copper electrolytic solution, this allows the copper foil physical properties to be uniform and improves flexural endurance of the copper foil to improve battery lifespan cycle properties and prevent cracking.

In one implementation of the present disclosure, the electrolytic copper foil has one face in direct contact with the drum and the other face opposite to said one face, wherein a Rz roughness of each of said one and other faces is smaller than or equal to 2.0 μm. The active material in the secondary battery exhibits a volumetric change during charging and discharging. Therefore, it is very important to maintain good adhesion between the current collector, that is, the copper foil and the active material in order to maintain the lifespan of the battery excellent. Therefore, in order to improve the adhesion, the solvent spreadability of the active material should be improved and the distribution of the binder is uniform to enhance the adhesion, such that a surface roughness of the electrolytic copper foil should be small. When the surface roughness of each of one face and the other face of the electrolytic copper foil exceeds 2.0 μm, the adhesion between the current collector and the active material may be deteriorated and thus the battery performance may be deteriorated due to the volume change of the secondary battery during charging and discharging.

FIG. 1 is a flow chart illustrating a method for producing an electrolytic copper foil for a secondary battery according to one embodiment of the present disclosure. Referring to FIG. 1, a method for producing an electrolytic copper foil for a secondary battery according to the present disclosure includes (1) preparing a plating solution containing 60 g/L to 140 g/L of copper ions ($Cu^{2+}$), 70 g/L to 200 g/L of sulfuric acid, 10 ppm to 90 ppm of chlorine, and 100 ppm or greater of TOC, cobalt, and arsenic (S100); (2) performing electrolytic-plating using a drum by applying current density 30 ASD to 150 ASD at a temperature of 30° C. to 70° C. to form an electrolytic copper foil (S200); and (3) coating a negative electrode active material with the electrolytic copper foil (S300).

In step (1) (S100), as a step of preparing the plating solution, the plating solution containing 60 g/L to 140 g/L of copper ions ($Cu^{2+}$), 70 g/L to 200 g/L of sulfuric acid, 10 ppm to 90 ppm of chlorine, 100 ppm or greater of TOC, and cobalt, and arsenic may be prepared. The TOC in the plating solution plays a role in minimizing changes in the grain size in the electrolytic copper foil.

Further, in accordance with the present disclosure, the plating solution further contains cobalt, and arsenic as metallic additives in addition to TOC, to improve the flexural endurance of the electrolytic copper foil for the second battery. The electrolytic copper foil may be produced by performing the electrolytically-plating using the plating solution. In the plating solution, the TOC may be contained in a constant content. The cobalt may be contained at 1 mg/L to 50 mg/L therein, the arsenic may be contained at a content of 10 mg/L to 80 mg/L.

When the electrolytic copper foil is produced by electrolytic-plating the plating solution, the contents of the additives such as TOC, cobalt, and arsenic that are contained in the plating solution may not always be equal to those in the electrolytic copper foil produced via the electrolytic-plating. Rather, the former may be substantially same as or smaller than the latter.

The cobalt, and arsenic are used to control a plating rate of the copper during electrolytic plating to smoothen a surface of the copper foil. The cobalt, and arsenic are used to suppress an excessive increase in the carbon content inside the electrolytic copper foil. Thus, when a ratio between a sum of contents of the cobalt, and arsenic and the TOC content in the electrolytic copper foil meets the following Equation 1, the change in the physical properties of the electrolytic copper foil is minimized at low temperatures.

TOC content/(cobalt content+arsenic content)=1.30 to 1.55     [Equation 1]

When TOC content/(cobalt content +arsenic content) is smaller than 1.30, the content of the sum of cobalt, and arsenic added to the plating solution is increased to inhibit a degree at which the TOC prevents abnormal growth in the plating solution. When TOC content/(cobalt content+arsenic content) exceeds 1.55, stress is generated in the grain due to excessive TOC content in the electrolytic copper foil. In this case, after plating, the grains in the electrolytic copper foil grow abnormally. This prevents formation of a crystal structure favorable to flexural endurance. Therefore, to improve the flexural endurance of the electrolytic copper foil for secondary batteries, TOC content/(cobalt content+arsenic content) may be preferably between 1.30 and 1.55 to meet the Equation 1.

When the contents of copper ions and sulfate ions in the plating solution are out of the above defined range, there is a problem that, in the electrolytic-plating performed subsequently, the copper is not properly precipitated or the hardness of the copper foil is lowered.

Further, in the plating solution, chlorine is contained at a concentration of 10 ppm to 90 ppm. Chlorine allows $CuCl_2$ precipitates formed at the interface of the grain boundaries during electrolytic-plating to suppress the crystal growth when the plating solution is heated to high temperatures, thereby improving thermal stability at high temperatures. When the chlorine concentration is out of the range of 10 ppm to 90 ppm, the tensile strength of the electrolytic copper foil may be lowered and thermal stability at high temperature may be lowered.

In Step (2) (S200), the plating solution prepared in the step (1) has current at a current density of 30 ASD (Ampere per Square Deci-metre) to 150 ASD applied thereto under a condition of a temperature of 30° C. to 70° C., thereby to perform the electrolytic-plating using a drum. For reference, FIG. 2 shows a process of producing an electrolytic copper foil using a drum according to one embodiment of the present disclosure. When the plating temperature and current density are out of the above range, the surface of the electrolytic copper foil is not uniformly formed because the plating is not properly performed, such that the tensile strength and elongation may decrease, which may cause deterioration of battery performance.

In step (3) (S300), coating a negative electrode active material on the electrolytic copper foil formed by the electrolytic-plating may be executed. The electrolytic copper foil coated with the negative electrode active material via the step (3) (S300) may have improved bending endurance. Thus, the bending times thereof in the MIT bending test are 110 times or greater.

Further, the electrolytic copper foil formed by the electrolytic-plating via the step (2) has one face in contact with the drum and the other face opposite to the one face. The Rz roughness of each of the one face and the other face may be 2.0 μm or smaller. When the surface roughness of each of the one face and the other face of the electrolytic copper foil exceeds 2.0 μm, the adhesion between the current collector and the active material may be deteriorated and thus battery performance may be deteriorated due to the volume change of the secondary battery during charging and discharging. Therefore, the Rz roughness of each of the one face and the other face of the electrolytic copper foil is preferably 2.0 μm or smaller.

Further, the tensile strength of the electrolytic copper foil for the secondary battery according to the present disclosure is preferably in a range of 30 kgf/mm² to 51 kgf/mm². When the tensile strength is lower than 30 kgf/mm², the foil may be deformed or fractured in the press production process after coating the electrode active material. During charging and discharging of the secondary battery, the volume of the secondary battery expands or shrinks when active materials such as graphite exchange lithium ions. At this time, the active material layer is in contact with the electrolytic copper foil, such that stress due to the expansion or shrinkage occurs. Therefore, when the tensile strength is lower than 30 kgf/mm², the electrolytic copper foil fails to withstand the stress and may break. Thus, the batter performance may be deteriorated. Further, the anode and the cathode may be short-circuited due to the deformation due to the fracture.

Further, the elongation of the electrolytic copper foil for secondary batteries according to the present disclosure is preferably in a range between 2 and 18%. When the elongation of the electrolytic copper foil is high, this withstands the tension to prevent a fracture in coating the active material of the electrode production process, and, further, this may prevent the fracture which may otherwise occur due to a stress resulting from the process of winding the electrode. Further, the efficiency of the battery is improved by preventing the deterioration of the efficiency in the charge-discharge cycle of the battery and preventing the breakage. However, when the elongation exceeds 18%, the deformation of the secondary battery may become severe during charging and discharging, resulting in the short circuit. When the elongation is smaller than 2%, the electrolytic copper foil may break easily.

The aforementioned tensile strength and elongation are inversely proportional to each other. Thus, as the tensile strength increases, the elongation decreases, while as the tensile strength decreases, the elongation increases. In order to produce the electrolytic copper foils with the high tensile strength while preventing the breakage, it is important to maintain the appropriate range of the tensile strength and elongation. Therefore, the tensile strength is preferably maintained in the range of 30 kgf/mm² to 51 kgf/mm², and the elongation is preferably in the range of 2% to 18%.

Further, a thickness of the electrolytic copper foil for secondary batteries according to the present disclosure is preferably in a range of between 4 and 10 μm. When the thickness of the electrolytic copper foil is smaller than 4 μm, the electrolytic copper foil may easily break due to the thinness. When the thickness of the electrolytic copper foil exceeds 10 μm, the volume and weight of the produced secondary battery increases, which is not preferable.

Hereinafter, the Present Examples and the Comparative Examples in the present disclosure are described. However, the following Present Examples are merely the preferred examples of the present disclosure, and the scope of the present disclosure is not limited to the following Present Examples.

Experiment 1. Battery Life Test According to TOC Concentration and MIT Bending Times Present Example 1

A plating solution containing copper ions 100 g/L, sulfuric acid 110 g/L, chlorine 30 ppm, TOC 340 ppm, cobalt 0.025 g/L, and arsenic 0.045 g/L (total amount of cobalt, and arsenic: 0.0705 g/L) was prepared. An electrolytic-plating of the plating solution was performed using a drum at a current density of 90 ASD at 50 degrees C. The negative electrode active material was coated on the electrolytic copper foil formed by the electrolytic-plating.

Present Example 2 to Present Example 8

Electrolytic copper foils were produced in the same manner as Present Example 1 except that a concentration of TOC contained in the plating solution and a sum of cobalt, and arsenic therein were set as shown in a following Table 3.

Comparative Example 1 to Comparative Example 4

Electrolytic copper foils were produced in the same manner as Present Example 1 except that a concentration of TOC contained in the plating solution and a sum of cobalt, and arsenic therein were set as shown in the following Table 3.

The experimental conditions for Present Example 1 to Present Example 8 and Comparative Example 1 to Comparative Example 4 are as described above. For the electrolytic copper foils for the secondary battery as produced in accordance with Present Example 1 to Present Example 8 and Comparative Example 1 to Comparative of Example 4, a room temperature tensile strength and elongation, bending times in MIT tests, and battery lifespan after 300 cycles were measured. The measurements are shown in the following Tables 2 and 3.

The tensile strength and elongation were measured as follows: each of the electrolytic copper foils obtained in accordance with Present Example 1 to Present Example 8 and Comparative Examples 1 to 3 was cut into a 12.7 mm width×a gauge length of 50 mm to form a tensile specimen. Then, the specimens were subjected to a tensile test at a crosshead rate of 50.8 mm/min in accordance with the IPC-TM-650 2.4.18B standard. A maximum load corresponding to a tensile strength as measured is defined as a tensile strength. An elongation at which the specimen breaks is defined as an elongation. The tensile strength and elongation were measured at a room temperature.

Further, TOC content/(cobalt content+arsenic content) after dissolving the copper foil was obtained as follows. Each of the electrolytic copper foils obtained according to Present Example 1 to Present Example 8 and Comparative Example 1 to Comparative Example 4 was dissolved into 60 ml of hydrochloric acid (35%) and 40 ml of hydrogen peroxide (30%). The dissolved solution was analyzed using ICP (Inductively coupled plasma mass spectrometry). In this connection, a sum of the metallic additives is the sum of cobalt, iron, and zinc. The ratio between the TOC content and the total content of the metallic additives is calculated using Equation 1 as described above. The following table 3 shows the results.

The MIT bending test was performed by a MIT bending tester. In the bending test, bending was repeated under following conditions. The number of bending times until the test specimens are broken is defined as bending times, and the results are shown in Table 3.
1) Status: Original foil
2) Bending radius (R): 0.38mm
3) Bending angle: 135°
4) Bending rate: 175 times/minute
5) Load: 500 g The battery evaluation conditions were set as follows. A cell design, anode, cathode, separator, and electrolyte conditions were set as shown in the following Table 1.

1) Constant current charging: Current value 1C, end-of-charge voltage 4.2V

2) Charging stop for 20 minutes

3) Constant current discharging: Current value 1C, end-of-charge voltage: 2.5V cut off 4) 1 C=487 mAh 5) Cycle: 300 cycles, temperature: 55° C.

TABLE 1

| High-level Classification | Low-level Classification | Unit | Specification |
|---|---|---|---|
| Cell design | Size | mm | 34 × 50 |
|  | Capacity | mAh | 487 |
|  | Current density | mAh/cm$^2$ | 3.06 |
|  | N/P ratio | — | 1.10 |
| Anode | Active material | — | LCO |
|  | Composition | Active material:conductive material:Binder | 92:4:4 |
|  | L/L | mg/cm$^2$ | 21.72 |
|  | Mixture density | g/cm$^3$ | 3.0 |
| Cathode | Active material | — | Natural graphite |
|  | Composition | Active material: Thickener:Binder | 96:2:2 |
|  | L/L | mg/cm$^2$ | 9.00 |
|  | Mixture density | g/cm$^3$ | 1.50 |
| Separator | Material | — | PE |
|  | Thickness | μm | 16 |
| Electrolytic liquid | Salt | — | 1.0M LiPF$_6$ |
|  | Solvent | — | EC:EMC = 3:7 |
|  | Additive | — | VC 3% |
|  | Amount | ∝ | 2.0 |

TABLE 2

| Examples | Thickness(μm) | Room temperature tensile strength | Room temperature elongation |
|---|---|---|---|
| Present Example 1 | 4 | 43.7 | 3.2 |
| Present Example 2 | 6 | 42.3 | 7.2 |
| Present Example 3 | 6 | 35.2 | 7.8 |
| Present Example 4 | 8 | 45.3 | 7.5 |
| Present Example 5 | 8 | 31.8 | 11.8 |
| Present Example 6 | 10 | 41.3 | 11.8 |
| Present Example 7 | 10 | 33.6 | 11.9 |
| Present Example 8 | 10 | 49.2 | 10.5 |
| Present Example 9 | 12 | 33.4 | 18 |
| Comparative Example 1 | 6 | 35.1 | 6.2 |
| Comparative Example 2 | 8 | 34.4 | 11.0 |
| Comparative Example 3 | 10 | 33.0 | 12.4 |
| Comparative Example 4 | 6 | 66.2 | 2.8 |

[Table 3]

TABLE 3

| Examples | Bending times In MIT test | Battery lifespan of 300 cycles | TOC concentration | TOC/(Co + As) after dissolving copper foil |
|---|---|---|---|---|
| Present Example 1 | 120 | 88.3 | 340 | 1.45 |
| Present Example 2 | 200 | 88.4 | 220 | 1.43 |
| Present Example 3 | 111 | 88.5 | 101 | 1.35 |
| Present Example 4 | 168 | 87.8 | 1050 | 1.47 |
| Present Example 5 | 130 | 88.1 | 110 | 1.30 |
| Present Example 6 | 150 | 88.2 | 640 | 1.40 |
| Present Example 7 | 129 | 88.6 | 460 | 1.39 |
| Present Example 8 | 250 | 87.4 | 320 | 1.54 |
| Present Example 9 | 110 | 87.1 | 110 | 1.45 |
| Comparative Example 1 | 88 | 82.9 (fracture or peeled) | 83 | 1.11 |
| Comparative Example 2 | 87 | 85.4 (fracture or peeled) | 98 | 1.21 |
| Comparative Example 3 | 86 | 81.8 (fracture or peeled) | 72 | 1.15 |
| Comparative Example 4 | 90 | 82.6 (fracture or peeled) | 54 | 1.27 |

Referring to Table 2 and Table 3, it may be seen that, in Comparative Example 1 to Comparative Example 4 where the TOC concentration is lower than 100 ppm, MIT bending times are smaller than 90 times. On the other hand, in Present Example 1 to Present Example 8 where the TOC concentration is 100 ppm or greater, MIT bending times are greater than or equal to 110 times. In the electrolytic copper foil production, when the TOC is contained in the plating solution at a concentration of 100 ppm or greater, this may prevent the grain size and crystal structure in the copper foil from changing in the electrolytic-plating. Thus, the tensile strength and flexural endurance of the copper foil may be improved.

Further, in Comparative Example 1 to Comparative Example 4 in which TOC content/(cobalt content+arsenic content) is lower than 1.30, MIT bending times are smaller than 90 times. Thus, the batter lifespan is short after 300 cycles. When TOC content/(cobalt content+arsenic content) is lower than 1.30, the total content of cobalt, and arsenic is increasing such that the TOC in the plating solution is poor at preventing the abnormal growth of the grain. This inhibits formation of a crystal structure favorable to the flexural endurance.

Further, referring to Table 3, in order to check the state of the electrolytic copper foil (acting as a cathode plate) of the batteries according to Present Examples 1 to 8 and Comparative Example 1 to 4, which were subjected to 300 charging and discharging cycles, we disassembled the batteries. In this connection, the electrolytic copper foils according to Present Examples 1 to 8 could be confirmed to have the same appearance as an initial appearance without defects. On the other hand, in Comparative Example 1 to 4, the life span of the battery is deteriorated and a portion of the electrolytic copper foil was fractured or peeled off. Specifically, in Comparative Example 1, it was confirmed that the negative electrode active material was peeled off from the electrolytic copper foil. In Comparative Examples 2 to 4, we could confirm that fractured portions were present in an outer portion of the electrolytic copper foil.

Those of ordinary skill in the art to which the present disclosure belongs may understand that the present disclosure may be embodied in other specific forms without departing from the spirit or essential characteristics thereof. It is to be understood, therefore, that the presently disclosed embodiments are to be considered in all respects as illustrative and not restrictive. The scope of the present disclosure is set forth in the following claims rather than the detailed description. It is intended that all changes and modifications derived from the meaning and scope of the claims and their equivalents be included in the scope of the present disclosure.

What is claimed is:

1. An electrolytic copper foil for a secondary battery, wherein the electrolytic copper foil is capable of being coated with a negative electrode active material, the electrolytic copper foil comprising:
a layer containing copper, total organic carbon (TOC), and metal additives that contain cobalt and arsenic,
wherein a ratio of the TOC to the cobalt and the arsenic contained in the layer satisfies a following Equation 1:

TOC content/(cobalt content+arsenic content)=1.30 to 1.55.  [Formula 1]

2. The electrolytic copper foil of claim 1, wherein the electrolytic copper foil has bending times greater than or equal to 110 in a MIT bending test.

3. The method foil of claim 1, wherein the electrolytic copper foil has a first face and a second face that is opposite to the first face and a Rz roughness of each of the first and second faces is smaller than or equal to 2.0 µm.

4. The electrolytic copper foil of claim 1, wherein a tensile strength of the electrolytic copper foil is in a range of 30 kgf/mm² to 51 kgf/mm².

5. The electrolytic copper foil of claim 1, wherein an elongation of the electrolytic copper foil is in a range of 2% to 15%.

6. The electrolytic copper foil of claim 1, wherein a thickness of the electrolytic copper foil is in a range of 4 µm to 10 µm.

* * * * *